(12) United States Patent
Liang et al.

(10) Patent No.: US 12,464,275 B2
(45) Date of Patent: Nov. 4, 2025

(54) WIRELESS EARBUD ASSEMBLY

(71) Applicant: Harman International Industries, Incorporated, Stamford, CT (US)

(72) Inventors: Tieyi Liang, Shenzhen (CN); Yi Zhang, Shenzhen (CN); Bin Cai, Shenzhen (CN)

(73) Assignee: Harman International Industries, Incorporated, Stamford, CT (US)

( * ) Notice: Subject to any disclaimer, the term of this patent is extended or adjusted under 35 U.S.C. 154(b) by 238 days.

(21) Appl. No.: 18/465,712

(22) Filed: Sep. 12, 2023

(65) Prior Publication Data
US 2023/0421941 A1  Dec. 28, 2023

Related U.S. Application Data

(63) Continuation of application No. PCT/CN2021/080418, filed on Mar. 12, 2021.

(51) Int. Cl.
*H04R 1/10* (2006.01)
*H02J 7/00* (2006.01)
*H04R 5/033* (2006.01)

(52) U.S. Cl.
CPC .......... *H04R 1/1025* (2013.01); *H02J 7/0044* (2013.01); *H02J 7/0048* (2020.01);
(Continued)

(58) Field of Classification Search
CPC .. H04R 1/1025; H04R 1/1016; H04R 1/1041; H04R 5/033; H04R 2420/07; H02J 7/0048; H02J 7/0044
(Continued)

(56) References Cited

U.S. PATENT DOCUMENTS 9,949,015 B1 * 4/2018 Minoo ................ H02J 7/0044
10,701,472 B1   6/2020 Xu et al.
(Continued)

FOREIGN PATENT DOCUMENTS

CN    210042141 U    2/2020
CN    111049230 A    4/2020
(Continued)

OTHER PUBLICATIONS

International Search Report issued in corresponding International Application PCT/CN2021/080418, mailed Dec. 8, 2021.

*Primary Examiner* — David L Ton
(74) *Attorney, Agent, or Firm* — Burris Law, PLLC

(57) ABSTRACT

An earbud assembly includes a charging case and at least one wireless earbud suitable to be stowed in the charging case. The charging case includes a battery, a charger electrically connected to the battery, a sensor configured to detect the opening and closing operations of the charging case, a battery status indicator that has a first state when the battery of the charging case is in a normal working condition and a second state when the battery of the charging case is exhausted. The earbud includes a processor and a status detector for detecting the state of the battery status indicator when the earbud is stowed in the charging case. The processor of the earbud is configured to power off the earbud when the status detector detects that the battery status indicator is in the second state.

20 Claims, 5 Drawing Sheets

(52) U.S. Cl.
CPC ......... *H04R 1/1016* (2013.01); *H04R 1/1041* (2013.01); *H04R 5/033* (2013.01); *H04R 2420/07* (2013.01)

(58) Field of Classification Search
USPC .......................................................... 381/311
See application file for complete search history.

(56) References Cited

U.S. PATENT DOCUMENTS

| | | |
|---|---|---|
| 2018/0091884 A1 | 3/2018 | Minoo et al. |
| 2021/0152036 A1* | 5/2021 | Sun .......................... H04M 1/04 |
| 2022/0321987 A1 | 10/2022 | Li et al. |

FOREIGN PATENT DOCUMENTS

| | | |
|---|---|---|
| CN | 211981536 U | 11/2020 |
| CN | 212086454 U | 12/2020 |

* cited by examiner

WIRELESS EARBUD ASSEMBLY

CROSS-REFERENCE TO RELATED APPLICATION

This application is a continuation of International Application No. PCT/CN2021/080418, filed on Mar. 12, 2021. The disclosure of the above application is incorporated herein by reference.

FIELD

The present disclosure relates to a wireless earbud assembly, and particularly to a wireless earbud assembly comprising a charging case and earbuds.

BACKGROUND

The statements in this section merely provide background information related to the present disclosure and may not constitute prior art.

In recent years, wireless earbuds, especially TWS earbuds, have become more and more popular due to their convenience. When not in use, wireless earbuds are usually stowed in a charging case, which can contain and charge the earbuds stowed therein.

Many charging cases have a hall sensor to detect the opening or closing operation of the charging case, in order to power on or power off in response to the opening or closing operation of the charging case. For example, when the charging case is opened, the hall sensor will detect the opening operation and the charging case will trigger the earbuds to power on. When the charging case is closed, the hall sensor will detect the closing operation and the charging case will trigger the earbuds therein to power off or to enter a sleep mode.

The charging case with a hall sensor has an inherent problem, i.e., when the charging case runs out of battery, the hall sensor cannot detect the opening or closing operation anymore due to lack of power, and thus the charging case cannot properly power on or power off the earbuds even if the earbuds still have power, resulting in a bad user experience.

SUMMARY

This section provides a general summary of the disclosure and is not a comprehensive disclosure of its full scope or all of its features.

According to one aspect of the disclosure, an earbud assembly comprising a charging case and at least one wireless earbud suitable to be stowed in the charging case is provided, wherein the charging case comprises a battery; a charger/booster electrically connected to the battery; a sensor configured to detect the opening and closing operations of the charging case; a battery status indicator that has a first state when the battery of the charging case is in a normal working condition and a second state when the battery of the charging case is exhausted; wherein the at least one earbud comprises a processor and a status detector for detecting the state of the battery status indicator when earbud is stowed in the charging case; wherein the processor of the earbud is configured to power off the earbud when the status detector detects that the battery status indicator is in the second state.

According to one or more embodiments of the disclosure, the status detector is further configured to detect a connection status between the charging case and the earbud, and the processor of the earbud is configured to power on the earbud when a disconnection of the earbud from the charging case is detected.

According to one or more embodiments of the disclosure, the status detector is further configured to detect a connection status between the charging case and the earbud, and the processor of the earbud is configured to power on the earbud when a disconnection of the earbud from the charging case is detected after a detection of a second state of the battery status indicator.

According to one or more embodiments of the disclosure, the at least one wireless earbud is a pair of TWS earbuds.

According to one or more embodiments of the disclosure, the first state of the battery status indicator is a cut-off state and the battery status indicator has a low resistance in the second state.

According to one or more embodiments of the present disclosure, the charging case has two contacts configured to be electrically connected to two contacts of the earbuds when the earbud in stowed in the charging case, and the battery status indicator is connected between the two contacts of the charging case.

According to one or more embodiments of the present disclosure, the battery case further comprises a processor, the battery status indicator comprises a resistor R1, a P-type MOSFET Q2 and two N-type MOSFET Q1, Q3, wherein the P-type MOSFET Q2 and N-type MOSFET Q1 are connected in series between the two contacts of the charging case, the gates of P-type MOSFET Q2 and N-type MOSFET Q1 are connected to the processor, the resistor R1 and the N-type MOSFET Q3 are connected in series between the two contacts of the charging case, and the gate of N-type MOSFET Q3 is connected between Q1 and Q2.

According to one or more embodiments of the present disclosure, the earbud has two contacts configured to be electrically connected to the two contacts of the charging case when the earbud in stowed in the charging case, and the status detector is connected between the two contacts of the earbud.

According to one or more embodiments of the present disclosure, the status detector comprises a LDO connected to the battery of the earbud for providing a stable voltage source, and a resistor R2 and a diode D1 connected in series between one contact of the two contacts of the earbud and the stable voltage source, the status detector further comprises a device for detecting the voltage at the one contact.

According to one or more embodiments of the present disclosure, the status detector further comprises a MOSFET Q4 and a resistor R3 connected in series between the stable voltage source and the other contact of the two contacts of the earbud, the gate of the MOSFET Q4 is connected between the resistor R2 and the diode D1.

According to one or more embodiments of the present disclosure, the sensor is a Hall sensor.

According to one or more embodiments of the present disclosure, the battery status indicator is an insolation switch connected to the battery of the charging case.

According to another aspect of the disclosure, a method of powering on or powering off an earbud is provided, the method comprising: providing an earbud assembly as described above; detecting a state of the battery status indicator by using the status detector; powering off the earbud when the second state of the battery status indicator is detected.

According to one or more embodiments of the present disclosure, the method further comprises: detecting the state of the battery status indicator and the connection status between the charging case and the earbud; powering on the earbud a detection of a disconnection of the earbud from the charging case.

According to one or more embodiments of the present disclosure, the method further comprises: detecting the state of the battery status indicator and the connection status between the charging case and the earbud; powering on the earbud when a disconnection of the earbud from the charging case is detected after a detection of a second state of the battery status indicator.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
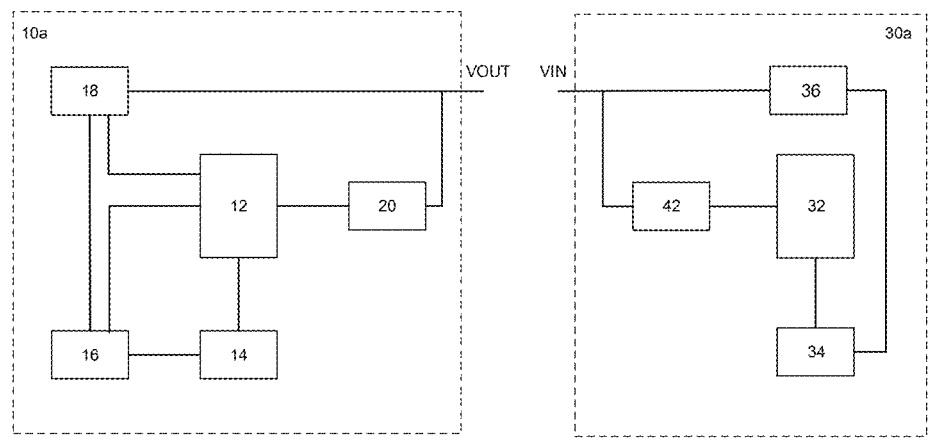
FIG. 1 is a block diagram of an earbud assembly of one or more embodiments according to the principles of the disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. One or more embodiments of the present disclosure will be described in more detail with reference to the accompanying drawings.

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various elements, components, steps or calculations, these elements, components, steps or calculations should not be limited by these terms, rather these terms are only used to distinguish one element, component, step or calculation from another. For example, a first component could be termed a second component, similarly a first calculation could be termed a second calculation; similarly a first step could be termed a second step; all without departing from the scope of this disclosure.

The battery in a charging case normally has a protection circuit, which will cut off the battery power supply to other components, such as processor, sensors, etc., in the charging case when the battery power is too low, in order to protect the battery. As used herein, the phrases or terms "normal working condition" of the battery and/or "battery is not exhausted" refer to a condition when the battery still has power and the protection circuit of the battery has not cut off the battery power supply. The phrases or terms "run out of battery" and/or "battery is exhausted" refer to the condition when the battery power is too low and the protection circuit has cut off the battery power supply to any other component in the charging case. That is, when the battery of the charging case is in its normal working condition or the battery is not exhausted, other components in the charging case, such as processor, sensors, can be powered by the battery. When the battery of the charging case is exhausted or the charging case runs out of battery, none of the other components in the charging case, such as processor, sensors, is still powered by the battery of the charging case. As used herein, the phrases "power on the earbud" means waking up the earbud and the phrase "power off the earbud" means causing the earbud to enter a sleep mode.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The disclosure provides for a wireless earbud assembly comprising a charging case and a pair of wireless earbuds that can be stowed in the charging case. The charging box comprises a battery status indicator that has a first state when the battery of the charging case is in a normal working condition and a second state when the battery of the charging case is exhausted. The earbuds can detect the first and second states of the battery status indicator when the earbuds are stowed in the charging case. The earbuds can also detect the connection status between the charging case and the earbud. Thus, the earbuds can determine whether or not they are stowed in the charging case or taken out of the charging case even when the charging case runs out of battery. Therefore, the earbuds can be properly powered on or woken up when it is taken out of the charging case, and can be properly powered off or enter a sleep mode when it is put into the charging case, even when the charging case runs out of battery.

FIG. 1 is a block diagram of an earbud assembly according to one or more embodiments of the present disclosure. The earbud assembly comprises a charging case 10a and a pair of earbuds 30a (only one earbud is shown in FIG. 1).

When the earbud 30a is stowed in the charging case 10a, the contact VIN of the earbud 30a is electrically connected to the contact VOUT of the charging case 10a. When the earbud 30a is taken out of the charging case 10a, the contact VIN of the earbud 30a is disconnected from the contact VOUT of the charging case 10a. As shown, the charging case 10a comprises a MCU 12, a Hall sensor 14, a battery 16, a charger/booster 18 and a battery status indicator 20. The charger/booster 18 is electrically connected to the battery 16 and the contact VOUT. The charger/booster 18 is configured to charge the battery 16 when the charging case is connected to an external power source, and is configured to boost the voltage of the battery to a voltage suitable for charging an earbud when the charging case is charging the earbud stowed therein. The Hall sensor 14 is electrically connected to and powered by the battery 16 of the charging case 10a and is configured to detect an opening and closing operation of the charging case 10a. When the charging box is opened, the Hall sensor 14 detects an opening operation of the charging case 10a and sends an "open" signal to MCU 12, notifying the MCU 12 that the charging case 10a is opened. When the charging box 10a is closed, the Hall sensor 14 detects a closing operation of the charging case 10a and sends a "close" signal to MCU 12, notifying the MCU 12 that the charging case 10a is closed.

After the MCU 12 received the "open" signal, the MCU 12 will send a "power on" signal to the earbuds stowed in the charging case 10a and the earbuds will be powered on upon the receipt of the "power on" signal. After the MCU 12 receives a "close" signal, the MCU 12 will send a "power off" signal to the earbuds stowed in the charging case 10a and the earbuds will be powered off upon the receipt of the "power off" signal.

In one or more embodiments of the present disclosure, the "power on" signal is a high voltage signal for a first predetermined time period and the "power off" signal is a high voltage signal for a second predetermined time period provided by the charger/booster 18. In one or more embodiments, after the MCU 12 receives the "open" or "close" signal, MCU 12 provides an instruction to the charger/booster 18, which in turn boosts the voltage of the battery 16 for the first or second predetermined time period, providing a high voltage signal for the first or second predetermined time period to the earbud stowed in the charging box via the contact VOUT of the charging case and the contact VIN of the earbud. In this way, the earbuds stowed in the charging case can be powered on when the charging case is opened and can be powered off when the charging case is closed. The first predetermined time period is different from the second predetermined time period and in one or more embodiments of the present disclosure the first and/or second predetermined time period can be a time period less than 500 milliseconds (ms). In one or more embodiments of the present disclosure, the high voltage signal may have a voltage of 5V or any other suitable high voltage. In one or more embodiments of the present disclosure, the "power on" and/or "power off" signals can be any other suitable signal.

The battery status indicator 20 is connected to the MCU 12, which provides a constant signal to the battery status indicator 20. The constant signal provided to the battery status indicator 20 may be a high level signal, such as a signal of 3.3V, which is maintained as long as the MCU 12 is powered. In the charging case 10a of the present disclosure, the MCU 12 is powered as long as the battery 16 is in a normal working condition, i.e., the battery 16 is not exhausted. Thus, the battery status indicator will be provided with a constant signal (high level signal) as long as the battery 16 is not exhausted. The battery status indicator 20 has a first state when the constant signal (high level signal) provided to the battery status indicator 20 is maintained and a second state when the constant signal (high level signal) is not provided. Therefore, the battery status indicator 20 will have a first state as long as the battery 16 is in its normal working condition, i.e., the battery is not exhausted, and will have a second state only when the battery 16 is exhausted. In one or more embodiments of the present disclosure, the battery status indicator 20 may have a high resistance in the first state, e.g., a cut-off state and a low resistance in the second state.

The earbud 30a comprises a MCU 32 with bluetooth, a battery 34, a charger 36 and a status detector 42. The charger 36 is electrically connected to the contact VIN and the battery 34, and is configured to receive electric power from the charging box 10a via the contacts VIN, VOUT, and to charge the battery 34 by using the electric power received from the charging box 10a when the earbud 30a is stowed in the charging box 10a.

In the normal working condition of the charging case 10a (battery 16), when the charging case 10a is opened, the Hall sensor 14 detects the opening operation of the charging case 10a, and the charging case 10a (the charger/booster 18) sends a "power on" signal to the earbud 30a stowed in the charging case 10a via the contacts VOUT, VIN. The status detector 42 receives the "power on" signal from the charging case 10a, and sends a signal to the MCU 32 to power on the earbud 30a. When the charging case 10a is closed, the Hall sensor 14 detects the closing operation of the charging case 10a, and the charging case 10a (the charger/booster 18) sends a "power off" signal to the earbud 30a stowed in the charging case 10a via the contacts VOUT, VIN. The status detector 42 receives the "power off" signal from the charging case 10a, and sends a signal to the MCU 32 to power off the earbud 30a.

When the battery 16 is exhausted, the Hall sensor 14 is not powered by the battery 16 and thus cannot detect the opening operation or the closing operation of the charging case. In this condition, the MCU 12 is also not powered by the battery 16 and thus stops providing the aforesaid constant signal (high level signal) to the battery status indicator 20, and thus the battery status indicator 20 has the second state. When the status detector 42 detects the second state of the battery status indicator 20, it means that the earbud 30a is stowed in the charging case and the battery 16 of the charging case is exhausted. Then, the status detector 42 sends a "power off" signal to the MCU 32 to power off the earbud. When the status detector 42 detects that the earbud 30a is disconnected from the charging case 10a, the status detector 42 sends a "power on" signal to the MCU 32 to power on the earbud 30a. In one or more embodiments of the present disclosure, when the status detector 42 detects a second state of the battery status indicator 20 and then detects that the earbud 30a is disconnected from the charging case 10a (meaning that the earbud is taken out of a charging case having an exhausted battery), the status detector 42 sends a "power on" signal to the MCU 32 to power on the earbud 30a.

Therefore, the earbud 30a as shown in FIG. 1 can be properly powered on and/or powered off in a normal working condition of the charging case 10a, and even when the charging case runs out of battery, the earbud 30a can still be powered on when it is taken out of the charging case, and can be powered off when it is put into the charging case, and thus resulting in an improved user experience.

Figure 2:
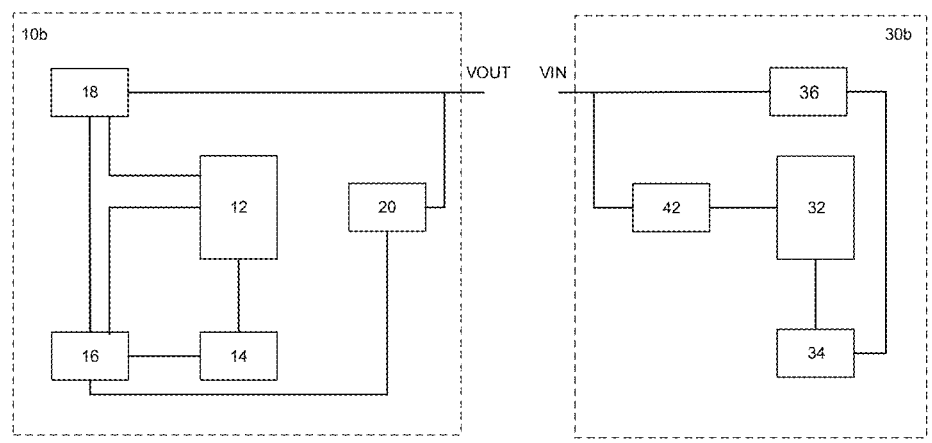
FIG. 2 shows a block diagram of an earbud assembly according to one or more embodiments of the present disclosure.

FIG. 2 shows a block diagram of an earbud assembly according to one or more embodiments of the present disclosure, comprising a charging box 10b and an earbud 30b. The form shown in FIG. 2 is similar to that shown in FIG. 1, except that in FIG. 1, MCU 12 is connected to the battery status indicator 20 and provides a constant signal to the battery status indicator 20 as long as the battery 16 is in a normal working condition, while in FIG. 2, the battery status indicator 20 is not connected to MCU 12, but is electrically connected to the battery 16. In the form of FIG. 2, the battery 16 will always supply power to the battery status indicator 20 as long as the battery 16 is in a normal working condition, i.e., as long as the battery 16 is not exhausted. The battery status indicator 20 has a first state when it is powered by the battery 16, and has a second state when it is not powered by the battery 16. That is, the battery status indicator 20 will have a first state as long as the battery 16 is in its normal working condition, i.e., the battery is not exhausted, and will have a second state only when the battery 16 is exhausted. Thus, the battery status indicator 20 can provide an indication about whether or not the battery 16 is exhausted. In one or more embodiments of the present disclosure, the battery status indicator 20 may have a high resistance in the first state and a low resistance in the second state. Other elements and operations of the form shown in FIG. 2 are similar or the same to those of the form shown in FIG. 1, and thus detailed description therefor is omitted.

Figure 3:
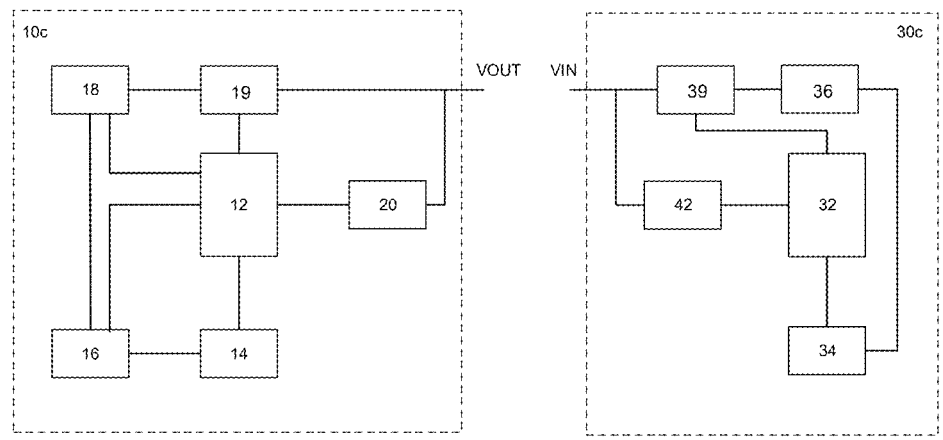
FIG. 3 shows a block diagram of an earbud assembly according to one or more embodiments of the present disclosure.

FIG. 3 shows a block diagram of an earbud assembly according to one or more embodiments of the disclosure. The form shown in FIG. 3 is similar to that shown in FIG. 1, except in FIG. 3, the charging case 10c comprises a switch devices 19 that is connected between the charger/booster 18 and the contact VOUT and is also connected to MCU 12, and the earbud 39 comprises a switch device 39 that is connected between the charger 36 and the contact VIN and is also connected to MCU 32. The MCU 12 can control the switch device 19 to switch between two operating mode, i.e., a first mode in which the contact VOUT is electrically connected to the charger/booster 18 and a second mode in which the contact VOUT is electrically connected to the MCU 12. Similarly, the MCU 32 can control the switch device 39 to switch between two operating mode, i.e., a first mode in which the contact VIN is electrically connected to the charger 36 and a second mode in which the contact VIN is electrically connected to the MCU 32. In the form shown in FIG. 3, when the earbud 30c is stowed in the charging case 10c, the earbud assembly can operate in one of two operating modes, i.e., a charging mode and a communicating mode. In the charging mode, both of the switch devices 19 and 39 operate in the first mode and thus the charger/booster 18 is electrically connected to the charger 36 via the switch devices 19, 39 so that the charging case 10c can charge the battery of the earbud 30c. In the communicating mode, the MCU 12 is connected to MCU 32 (the status detector 42) via the switch devices 19, 39 so that the MCU 12 and MCU 32 can communicate with each other, e.g. through a UART protocol. Other elements and operations of the form shown in FIG. 3 are similar or the same to those of the form shown in FIG. 1, and thus detailed description therefor is omitted.

Figure 4:
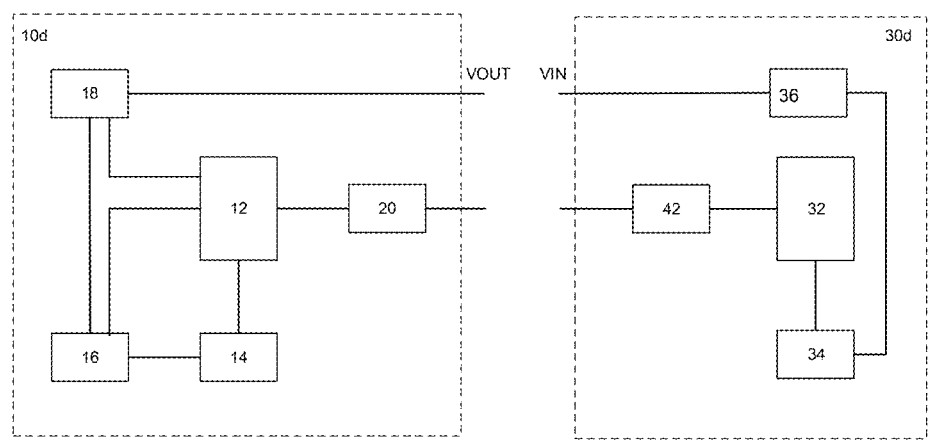
FIG. 4 shows a block diagram of an earbud assembly according to one or more embodiments of the present disclosure.

FIG. 4 shows a block diagram of an earbud assembly according to one or more embodiments of the disclosure. The form shown in FIG. 4 is similar to that shown in FIG. 1, except that in FIG. 1, the battery status indicator 20 is connected to the contact VOUT and the status detector 42 is connected to the contact VIN, and thus the status detector 42 can be connected to the battery status indicator 20 and detect the status of the battery status indicator 20 via the contact VOUT and the contact VIN when the earbud 30d is stowed in the charging case 10d, while in FIG. 4, the status detector 42 and the battery status indicator 20 can be connected to and communicated with each other via a separate contact when the earbud 30d is stowed in the charging case 10d. Other elements and operations of the form shown in FIG. 4 are similar or the same to those of the form shown in FIG. 1, and thus their detailed description thereof is omitted.

Figure 5:
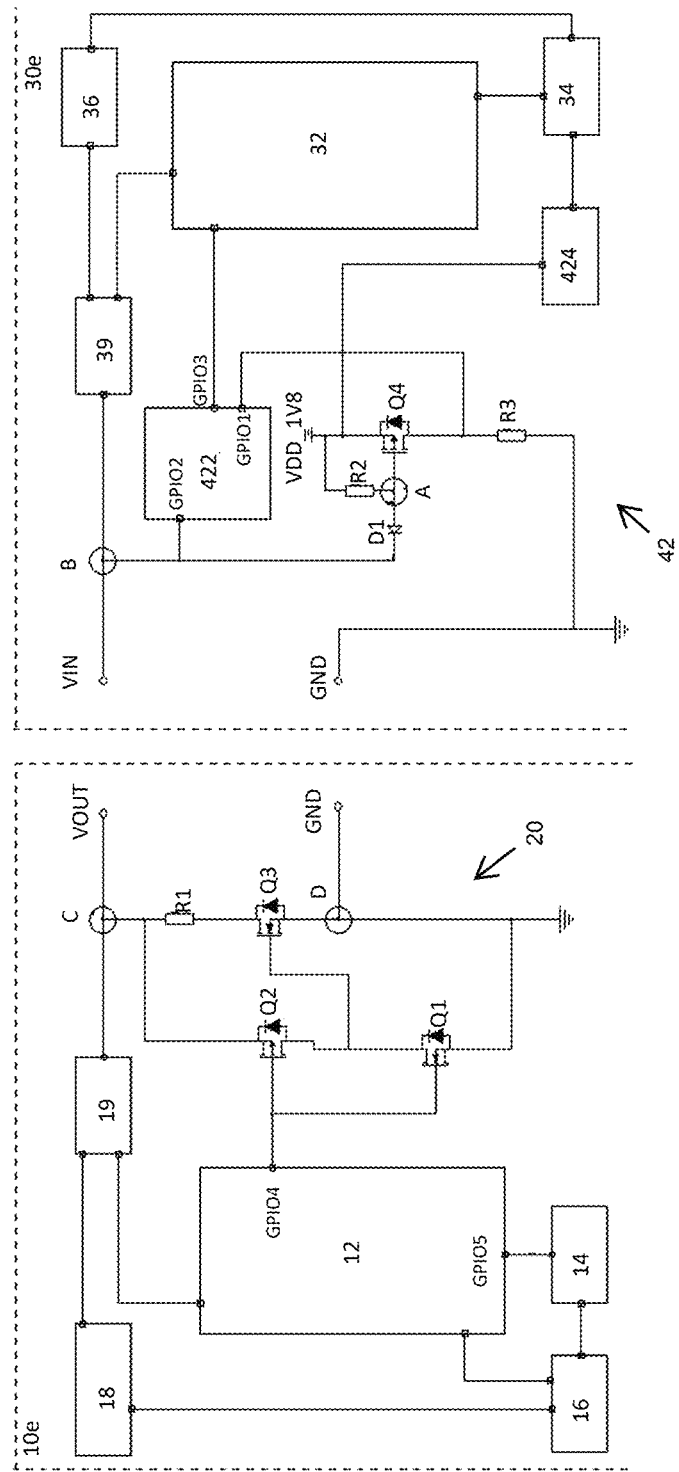
FIG. 5 shows an earbud assembly according to one or more embodiments of the present disclosure.

FIG. 5 shows an earbud assembly according to one or more embodiments of the present disclosure. The earbud assembly shown in FIG. 5 comprises a charging case 10e and a pair of earbuds 30e (only one earbud is shown in FIG. 5). As shown, the charging case 10e comprises a MCU 12, a Hall sensor 14, a battery 16, a charger/booster 18, a switch device 19 and a battery status indicator 20. The earbud 30e comprises a MCU 32 with bluetooth, a battery 34, a charger 36, a switch device 39 and a status detector 42. The form shown in FIG. 5 is similar to those shown in FIG. 3, except that FIG. 5 shows specific circuits for the battery status indicator 20 and the status detector 42. The battery status indicator 20 in the form of FIG. 5 has a first state when the battery 16 is in its normal working condition and, and has a second state when the battery 16 is exhausted. In one or more embodiments of the present disclosure, the battery status indicator 20 may have a high resistance in the first state (cut-off state) and a low resistance in the second state. Other components in FIG. 5, such as MCU 12, Hall sensor 14, battery 16, charger/booster 18 and switch device 19, are similar to those in FIG. 3, and detailed description thereof is omitted. FIG. 5 also shows a contact VOUT, a contact GND in the charging case 10e and a contact VIN, a contact GND in the earbud 30e. When the earbud 30e is stowed in the charging case 10e, the contact VIN and the contact GND of the earbud 30e are electrically connected to the contact VOUT and the contact GND of the charging case 10e respectively. When the earbud 30e is taken out of the charging case 10e, the contacts VIN and GND of the earbud 30e are disconnected from the contacts VOUT and GND of the charging case 10e.

As shown in FIG. 5, the battery status indicator 20 comprises a resistor R1, a P-type MOSFET Q2 and two N-type MOSFET Q1, Q3. As shown, MOSFET Q2 and Q1 are connected in series between the contact VOUT and ground, the gates of Q2 and Q1 are connected to GPIO4 of MCU12. The resistor R1 and MOSFET Q3 are connected in series between contact VOUT and ground, and the gate of MOSFET Q3 is connected to a line between MOSFET Q1 and MOSFET Q2. The status detector 42 comprises a CPLD (Complex Programming logic device) 422, a LDO (Low Dropout Regulator) 424, two resistors R2, R3, a MOSFET Q4 and a diode D1. The LDO 424 is electrically connected to the battery 34, so as to provide a 1.8V reference voltage VDD_1V8. The diode D1 and the resistor R2 are connected in series between the contact VIA and VDD_1V8. The MOSFET Q4 and the resistor R3 are connected in series between VDD_1V8 and ground. The gate of the MOSFET Q4 is connected to the contact VIN via the diode D1 and is connected to VDD_1V8 via the resistor R2. The CPLD 422 has three pins GPIO1, GPIO2, GPIO3, with the pin GPIO1 being connected to a line between the MOSFET Q4 and resistor R3, the pin GPIO2 being connected to the contact VIN, and the pin GPIO3 being connected to the MCU 32.

When the battery 16 is in its normal working condition, the battery 16 supplies power to MCU 12, which in turn provides a constant high level signal to the gates of MOSFET Q2 and MOSFET Q1. At this time, MOSFET Q1 is on and MOSFET Q2 is off. Since the MOSFET Q1 is on, the gate of MOSFET Q3 is electrically connected to ground, and thus the MOSFET Q3 is off. Therefore, when the battery 16 is in its normal working condition, the battery status indicator 20 (including a resistor R1, MOSFET Q1, Q2, Q3) is in a cut-off state (i.e., the first state of the battery status indicator 20).

When the battery 16 is in its normal working condition and the earbud 30e is stowed in the charging case 10e, the voltage at B and GPIO2 is either 5V (when the charging case 10e is charging the earbud 30e) or alternated between 3.3V and ground (when the charging case 10e is communicating with the earbud 30e). At this time, the voltage at A is high and thus the MOSFET Q4 is on, and thus the voltage at pin GPIO 1 of MCU 422 is high (e.g., 1.8V).

The resistor R2 has a relatively large resistance (e.g., 300 k) and the resistor R1 has a relatively small resistance (e.g. 1 k). When the battery 16 is exhausted and the earbud 30e is stowed in the charging box 10e, current flows from VDD_1V8 via the resistor R2, the diode D1 and reaches C, and the voltage at C will be higher than ground but significantly lower than VDD_1V8. Thus, the MOSFET Q2, Q3 will work in a resistive region (i.e., the second state of the battery status indicator 20). At this time, the voltage at B, C and GPIO2 is relatively low (slightly higher than ground and much lower than VDD_1V8). The voltage at A is relative low too and thus the MOSFET Q4 is off, and thus the pin GPIO 1 of MCU 422 is grounded through the resistor R3 (low voltage).

When the earbud 30e is taken out of the charging case 10e, the contact VIN is disconnected from the contact VOUT, and thus the voltage at B (GPIO2) is about 1.8V. The voltage at A is high (about 1.8V) and thus the MOSFET Q4 is on, and thus the pin GPIO 1 of MCU 422 is high (e.g. 1.8V).

The table 1 below shows the voltage and status of GPIO1 and GPIO2.

TABLE 1

| Charging case battery status | State between charging case and earbud | GPIO1 | GPIO2 | earbud state |
|---|---|---|---|---|
| Normal working status | | 1 | About 1.8 V | Out of charging case |
| | communicating | Alternating between 1 and 0 | Alternating between 1 (3.3 V) and 0 | In charging case |
| | charging | 1 | 1 (5 V) | |
| | No charging, no communicating | 1 | 1 (3.3 V) | |
| exhausted | | 1 | About 1.8 V | Out of charging case |
| | | 0 | About 0 | In charging case |

In the form of FIG. 5, when the pin GPIO2 of the CPLD 422 receives a "power on" signal from the charging case 10e (e.g., when the charging case is opened), it will send a "power on" signal to MCU 32 via GPIO3, and MCU 32 will power on or wake up the earbud 30e. When the pin GPIO2 of the CPLD 422 receives a "power off" signal from the charging case 10e (e.g., when the charging case is closed), it will send a "power off" signal to MCU 32 via GPIO3, and MCU 32 will power off the earbud 30e or let the earbud 30e enter a sleep mode.

When the voltage at GPIO1 is changed from high (1) to ground (0), it means either the earbud 10e is in a charging case 10e that just ran out of battery, or the earbud 10e is just put into a charging case 10e having an exhausted battery. Then, the CPLD 422 will send a "power off" signal to MCU 32 via GPIO3, and MCU 32 will power off the earbud 30e or let the earbud 30e enter a sleep mode.

When the voltage at GPIO1 is changed from ground (0) to high (1) and the voltage at GPIO2 is about 1.8V, it means that the earbud 10e is just taken out of a charging case 10e having an exhausted battery. Then, the CPLD 422 will send a "power on" signal to MCU 32 via GPIO3, and MCU 32 will in turn power on or wake up the earbud 30e.

Therefore, the earbud 30e as shown in FIG. 5 can be properly powered on and powered off in a normal working condition of the charging case 10a, and even when the charging case runs out of battery, the earbud 30e can still be powered on when it is taken out of the charging case, and can be powered off when it is put into the charging case, and thus resulting in an improved user experience.

In the form shown in FIG. 5, the CPLD 422 has a very small working current which is no more than 2 uA, and the LDO 424 has a very small quiescent current which is also no more than 2 uA. Although the CPLD 422 and LDO are under working condition even when the earbud is powered off (in a sleep mode), their power consumption is very low. The power consumption of the battery status indicator 20 and the status detector 42 is also very low due to the large resistance of the resistor R2 and the resistor R3 and the low power consumption of the CPLD 422 and the LDO 424.

Figure 6:
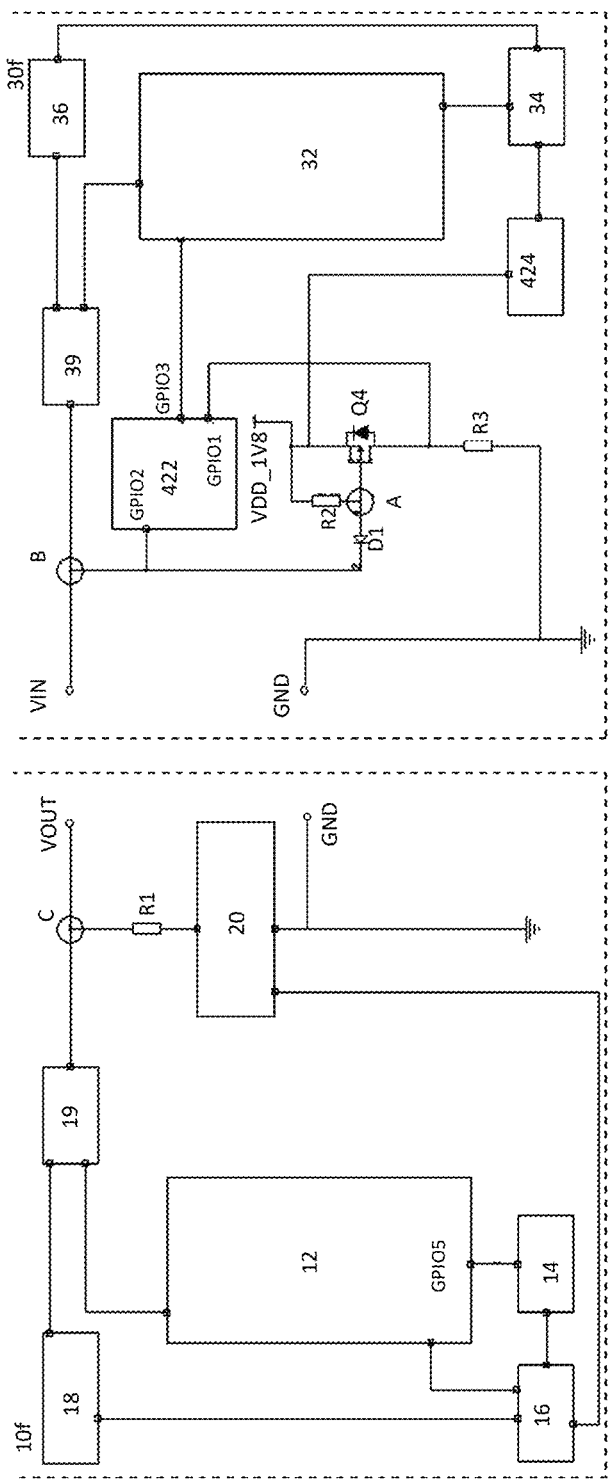
FIG. 6 shows an earbud assembly according to one or more embodiments of the present disclosure.

FIG. 6 shows an earbud assembly according to one or more embodiments of the present disclosure. The form shown in FIG. 6 is similar to that shown in FIG. 5, except that in FIG. 6, the battery status indicator 20 is an isolation switch. The battery status indicator 20 is not connected to MCU 12, but is electrically connected to the battery 16. In the form of FIG. 6, the battery 16 will always supply power to the battery status indicator 20 as long as the battery 16 is in a normal working condition, i.e., as long as the battery 16 is not exhausted. The battery status indicator 20 has a first state when it is powered by the battery 16, and has a second state when it is not powered by the battery 16. That is, the battery status indicator 20 will have a first state as long as the battery 16 is in its normal working condition, i.e., the battery is not exhausted, and will have a second state only when the battery 16 is exhausted. In one or more embodiments of the present disclosure, the battery status indicator 20 has a high resistance in the first state (cut-off state) and a low resistance in the second state. Other elements and operations of the form shown in FIG. 6 are similar or the same to those of the form shown in FIG. 5, and thus detailed description thereof is omitted.

While FIGS. 5-6 shows specific circuits for the battery status indicator and the status detector 42, the present disclosure is not limited thereto. For example, the battery status indicator may have any other suitable circuit, as long as it can have a first state, such as a cut-off state, when the battery 16 is in its normal working condition and can have a second state, such as a low resistance state, when the battery 16 is exhausted. For example, the battery status indicator shown in FIG. 6 can be replaced with any other suitable device as long as the device can have a first state, such as a cut-off state, when the battery 16 is in its normal working condition and can have a second state, such as a low resistance state, when the battery 16 is exhausted. For example, the status detector 42 shown in FIGS. 5-6 can be modified to any suitable form as long as it can detect the second state of the battery status indicator and can detect whether or not the earbud is connected to the charging case. For example, the resistor R3 and MOSFET Q4 can be omitted, and the second state of the battery status indicator and the connection status between the earbud and the charging case is solely determined by the voltage at GPIO2.

While FIGS. 1-6 shows various embodiments of the earbud assembly according to the present disclosure, the present disclosure is not limited thereto, and the features shown in different embodiments can be combine with one another. For example, the switch device in the embodiments shown in FIG. 3 can be incorporated into the embodiments shown in FIGS. 2 and 4. For example, the separate contacts for the battery status indicator 20 and the status detector 42 shown in FIG. 4 can also be incorporated into the embodiments shown in any of FIGS. 1-3. For example, the specific circuits for the battery status indicator and the status detector in the embodiments shown in FIGS. 5, 6 can also be incorporated into any of the embodiments shown in FIGS. 1-4.

In one or more embodiments shown, the charging case comprises a Hall sensor for detecting the opening and closing of the charging case. The present disclosure is not limited thereto, and any suitable sensor can be used as long as it can detect the opening and closing of the charging case. In one or more embodiments shown, each of the charging case and the earbud comprises an MCU. The present disclosure is not limited thereto, and any suitable processor may be used in place of the MCU.

While in one or more embodiments shown, the earbud is a TWS earbud, the present disclosure is not limited thereto, and any suitable wireless earbud can be used in the scope of the present disclosure.

Figure 7:
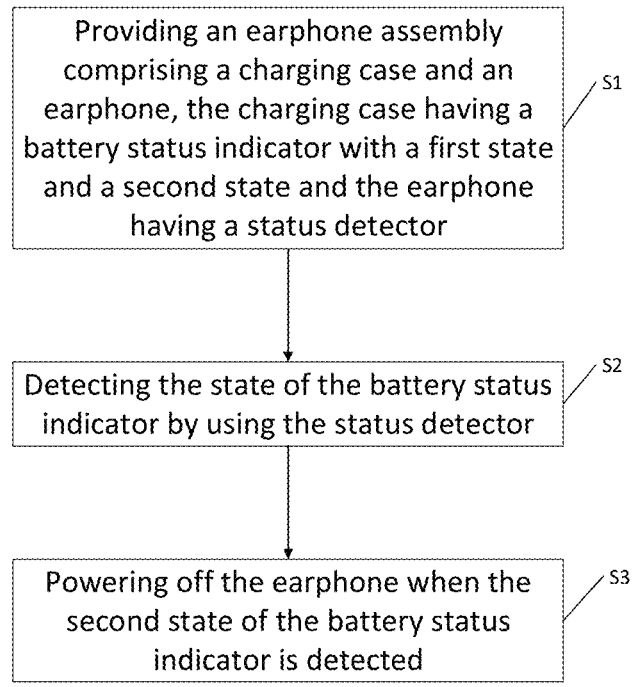
FIG. 7 shows a method according to one or more embodiments of the present disclosure.

FIG. 7 shows a method according to one or more embodiments of the present disclosure. In step S1, an earbud assembly comprising a charging case and at least one wireless earbud suitable to be stowed in the charging case is provided. The earbud assembly can be any of the earbud assemblies shown in FIGS. 1-6 or any other earbud assembly according to the present disclosure. The charging box comprises a battery status indicator that has a first state when the battery of the charging case is in a normal working condition and a second state when the battery of the charging case is exhausted. The earbuds has a status detector that can detect the first and second states of the battery status indicator when the earbuds are stowed in the charging case. The earbuds can also detect the connection status between the charging case and the earbud.

In step S2, the state of the battery status indicator of the charging case is detected by using the status detector of the earbud.

In step S3, when the second state of the battery status indicator is detected, the earbud is powered off. The battery status indicator of the charging case has a second state only when the battery of the charging case is exhausted. When the second state of the battery status indicator is detected, it means that the earbud is stowed in a charging case and the battery of the charging case is exhausted. Thus, the earbud can be properly powered off even when the charging case runs out of battery.

Figure 8:
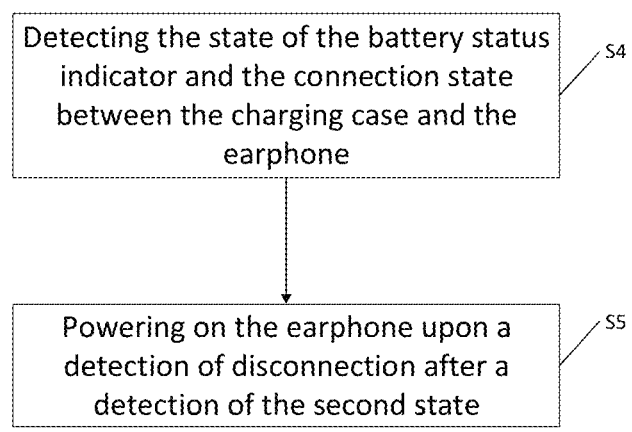
FIG. 8 shows a method according to one or more embodiments of the present disclosure.

FIG. 8 shows a method according to one or more embodiments of the present disclosure. The steps S4 and S5 can be executed in addition to the steps S1-S3, or can be executed in place of steps 2-3. In step S4, the state of the battery status indicator and the connection status between the charging case and the earbud is detected by using the status detector of the earbud. In step S5, when a disconnection of the earbud from the charging case is detected after a detection of a second state of the battery status indicator, the earbud is powered on. As described above, when the second state of the battery status indicator is detected, it means that the earbud is stowed in a charging case and the battery of the charging case is exhausted. When a disconnection of the earbud from the charging case is detected after a detection of a second state of the battery status indicator, it means that the earbud is taken out of a charging case with an exhausted battery. Thus, the earbud can be properly powered on even when the charging case runs out of battery.

The steps S1-S5 shown in FIGS. 7-8 are only illustrative, and the present disclosure is not limited thereto. The earbud assembly mentioned in steps S1-S5 can be any of the earbud assemblies shown in FIGS. 1-6, and thus any method or step described in connection with FIGS. 1-6 can be combined into the method shown in FIGS. 7-8. For example, the method can also include a step of powering on and/or powering off the earbud in response to a "power on" signal and/or "power off" signal from the charging case. The "power on" signal and "power off" signal from the charging case may be sent in response to a detection of the opening or closing operation of the charging case.

Systems and methods have been described in general terms as an aid to understanding details of the disclosure. In some instances, well-known structures, materials, and/or operations have not been specifically shown or described in detail to avoid obscuring aspects of the disclosure. In other instances, specific details have been given in order to provide a thorough understanding of the disclosure. One skilled in the relevant art will recognize that the disclosure may be embodied in other specific forms, for example to adapt to a particular system or apparatus or situation or material or component, without departing from the spirit or desired characteristics thereof. Therefore the disclosures and descriptions herein are intended to be illustrative, but not limiting, of the scope of the disclosure. Accordingly, the disclosure is not to be restricted except in light of the attached claims and their equivalents.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An earbud assembly, comprising:
a charging case and at least one wireless earbud suitable to be stowed in the charging case,
wherein the charging case comprises a battery; a charger electrically connected to the battery; a sensor configured to detect opening operations and closing operations of the charging case; a battery status indicator that has a first state when the battery of the charging case is in a normal working condition and a second state when the battery of the charging case is exhausted;
wherein the at least one wireless earbud comprises a processor and a status detector for detecting the state of the battery status indicator when the at least one wireless earbud is stowed in the charging case; and
wherein the processor of the at least one wireless earbud is configured to power off the at least one wireless earbud when the status detector detects that the battery status indicator is in the second state.

2. The earbud assembly according to claim 1, wherein the status detector is further configured to detect a connection status between the charging case and the at least one wireless earbud, and the processor of the at least one wireless earbud is configured to power on the at least one wireless earbud when a disconnection of the at least one wireless earbud from the charging case is detected.

3. The earbud assembly according to claim 1, wherein the status detector is further configured to detect a connection status between the charging case and the at least one wireless earbud, and the processor of the at least one wireless earbud is configured to power on the at least one wireless earbud when a disconnection of the at least one wireless earbud from the charging case is detected after a detection of the second state of the battery status indicator.

4. The earbud assembly according to claim 1, wherein the at least one wireless earbud is a pair of TWS earbuds.

5. The earbud assembly according to claim 1, wherein the first state of the battery status indicator is a cut-off state and the battery status indicator has a low resistance in the second state.

6. The earbud assembly according to any of claim 1, wherein the at least one wireless earbud is a pair of TWS earbuds, and wherein the charging case has two contacts configured to be electrically connected to two contacts of the pair of TWS earbuds when the pair of TWS earbuds are stowed in the charging case, and the battery status indicator is connected between the two contacts of the charging case.

7. The earbud assembly according to claim 6, wherein the charging case further comprises a processor, the battery status indicator comprises a resistor, a P-type MOSFET, a first N-type MOSFET, and a second N-type MOSFET, wherein the P-type MOSFET and the first N-type MOSFET are connected in series between the two contacts of the charging case, gates of the P-type MOSFET and the first N-type MOSFET are connected to the processor, the resistor and the second N-type MOSFET are connected in series between the two contacts of the charging case, and a gate of the second N-type MOSFET is connected between the first N-type MOSFET and the P-type MOSFET.

8. The earbud assembly according to claim 1, wherein the at least one wireless earbud has two contacts configured to be electrically connected to the two contacts of the charging case when the at least one wireless earbud is stowed in the charging case, and the status detector is connected between the two contacts of the at least one wireless earbud.

9. The earbud assembly according to claim 8, wherein the status detector comprises a LDO connected to the battery of the at least one wireless earbud for providing a stable voltage source, and a resistor and a diode connected in series between one contact of the two contacts of the at least one wireless earbud and the stable voltage source, the status detector further comprises a device for detecting the voltage at the one contact.

10. The earbud assembly according to claim 9, wherein the status detector further comprises an additional MOSFET and a resistor connected in series between the stable voltage source and the other contact of the two contacts of the at least one wireless earbud, a gate of the additional MOSFET is connected between the resistor and the diode.

11. The earbud assembly according to claim 1, wherein the sensor is a Hall sensor.

12. The earbud assembly according to claim 1, wherein the battery status indicator is an insolation switch connected to the battery of the charging case.

13. A method of powering on or powering off at least one earbud associated with a charging case, wherein the charging case comprises a battery; a charger electrically connected to the battery; a sensor configured to detect opening operations and closing operations of the charging case; the at least one earbud comprises a processor and a status detector for detecting a state of a battery status indicator when the at least one earbud is stowed in the charging case, the method comprising:
detecting the state of the battery status indicator by using the status detector; and
powering off the earbud when the state of the battery status indicator is detected.

14. The method of claim 13, further comprising:
detecting a state of the battery status indicator and the connection status between the charging case and the at least one earbud; and
powering on the at least one earbud based on a detection of a disconnection of the earbud from the charging case.

15. The method of claim 13, further comprising:
detecting a state of the battery status indicator and the connection status between the charging case and the at least one earbud; and powering on the at least one earbud when a disconnection of the at least one earbud from the charging case is detected after a detection of the state of the battery status indicator.

16. An earbud assembly, comprising:

a charging case and at least one wireless earbud suitable to be stowed in the charging case, wherein the charging case comprises a battery; a charger electrically connected to the battery; a sensor configured to detect opening operations and closing operations of the charging case; a battery status indicator that has a first state when the battery of the charging case is in a normal working condition and a second state when the battery of the charging case is exhausted;

wherein the at least one wireless earbud comprises a processor and a status detector for detecting the state of the battery status indicator when the at least one wireless earbud is stowed in the charging case;

wherein the processor of the at least one wireless earbud is configured to power off the at least one wireless earbud when the status detector detects that the battery status indicator is in the second state; and wherein the status detector is further configured to detect a connection status between the charging case and the at least one wireless earbud, and the processor of the at least one wireless earbud is configured to power on the at least one wireless earbud when a disconnection of the at least one wireless earbud from the charging case is detected.

17. The earbud assembly according to claim 16, wherein the status detector is further configured to detect a connection status between the charging case and the at least one wireless earbud, and the processor of the at least one wireless earbud is configured to power on the at least one wireless earbud when a disconnection of the at least one wireless earbud from the charging case is detected after a detection of the second state of the battery status indicator.

18. The earbud assembly according to claim 16, wherein the at least one wireless earbud is a pair of TWS earbuds.

19. The earbud assembly according to claim 16, wherein the first state of the battery status indicator is a cut-off state and the battery status indicator has a low resistance in the second state.

20. The earbud assembly according to any of claim 16, wherein the at least one wireless earbud is a pair of TWS earbuds, and wherein the charging case has two contacts configured to be electrically connected to two contacts of the pair of TWS earbuds when the pair of TWS earbuds are stowed in the charging case, and the battery status indicator is connected between the two contacts of the charging case.

* * * * *